(12) United States Patent
Stagray et al.

(10) Patent No.: US 6,797,365 B2
(45) Date of Patent: Sep. 28, 2004

(54) LAMINATE HAVING DIFFERENTIAL BOND STRENGTHS AND ABSORBENT ARTICLE MADE THEREFROM

(75) Inventors: David Allen Stagray, Neenah, WI (US); David Charles Musil, Appleton, WI (US); Amanda Rae Butler, Woodstock, GA (US); Sheila Marie Heyrman, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 295 days.

(21) Appl. No.: 10/119,181

(22) Filed: Apr. 8, 2002

(65) Prior Publication Data

US 2003/0190854 A1 Oct. 9, 2003

(51) Int. Cl.[7] .......................... B32B 27/12; B32B 27/04
(52) U.S. Cl. .................. 428/198; 428/195.1; 156/73.1; 442/327
(58) Field of Search ................................ 428/198, 688, 428/195, 351; 156/73.1; 442/327, 394

(56) References Cited

U.S. PATENT DOCUMENTS

| | | | |
|---|---|---|---|
| 3,672,371 A | | 6/1972 | Roeder |
| 3,674,595 A | | 7/1972 | Roeder |
| 3,688,771 A | | 9/1972 | Werner |
| 3,897,783 A | | 8/1975 | Ginocchio |
| 4,059,114 A | | 11/1977 | Richards |
| 4,333,466 A | | 6/1982 | Matthews |
| 4,578,069 A | | 3/1986 | Whitehead et al. |
| 4,795,455 A | | 1/1989 | Luceri et al. |
| 5,554,239 A | | 9/1996 | Datta et al. |
| 5,763,333 A | * | 6/1998 | Suzuki et al. .............. 442/351 |
| 5,843,057 A | | 12/1998 | McCormack |
| 5,910,137 A | | 6/1999 | Clark et al. |
| 6,075,179 A | | 6/2000 | McCormack et al. |
| 6,242,665 B1 | * | 6/2001 | Malowaniec ................. 602/41 |
| 6,264,642 B1 | * | 7/2001 | Kuen et al. ............ 604/385.28 |
| 6,309,736 B1 | | 10/2001 | McCormack et al. |
| 6,662,992 B2 | * | 12/2003 | Betrabet et al. ............. 228/1.1 |
| 2002/0034912 A1 | | 3/2002 | Curro et al. |

FOREIGN PATENT DOCUMENTS

| | | |
|---|---|---|
| DE | 2 055 127 | 5/1972 |
| EP | 0 025 611 B1 | 11/1982 |

(List continued on next page.)

OTHER PUBLICATIONS

Patent Cooperation Treaty Search Report from the International Search Authority, International Application No. PCT/US 03/ 06800 dated Jun. 26, 2003.

(List continued on next page.)

*Primary Examiner*—Terrel Morris
*Assistant Examiner*—A B Sperty
(74) *Attorney, Agent, or Firm*—Scott A. Baum; Thomas J. Connelly

(57) ABSTRACT

Disclosed is a laminate and absorbent articles made from the laminate where it can be used as an outer cover. In one embodiment, the laminate includes: a liquid-impermeable first layer having a first surface, a second layer having an interior surface adjacent the first surface and an exterior surface, at least a portion of the interior surface is joined to the first surface by an adhesive applied to the exterior surface, and the adhesive having a first bond peel strength of about 1 g/mm or greater. In another embodiment, the laminate induces: a liquid-impermeable first layer having a first surface, a nonwoven second layer having an interior surface adjacent the first surface and an exterior surface, at least a portion of the interior surface is joined to the first surface by first bonds having a first bond peel strength about 1 g/mm or greater, and at least a portion of the interior surface is joined to the first surface by second bonds having a second bond peel strength about 3 g/mm or less.

20 Claims, 2 Drawing Sheets

FOREIGN PATENT DOCUMENTS

| | | |
|---|---|---|
| EP | 0 705 583 A1 | 4/1996 |
| EP | 0 705 585 A1 | 4/1996 |
| EP | 0 745 368 A1 | 12/1996 |
| EP | 0 993 832 A1 | 4/2000 |
| EP | 1 008 332 A1 | 6/2000 |
| GB | 1 377 575 | 12/1974 |
| GB | 2 284 993 A | 6/1995 |
| GB | 2 285 408 A | 7/1995 |
| WO | WO 79/00839 A1 | 10/1979 |
| WO | WO 97/48360 | 12/1997 |
| WO | WO 97/48362 | 12/1997 |
| WO | WO 99/23987 | 5/1999 |
| WO | WO 99/32062 | 7/1999 |
| WO | WO 99/33498 | 7/1999 |
| WO | WO 00/23122 | 4/2000 |
| WO | WO 00/33781 | 6/2000 |
| WO | WO 00/37014 | 6/2000 |
| WO | WO 00/37015 | 6/2000 |
| WO | Wo 00/61053 | 10/2000 |
| WO | WO 00/61054 | 10/2000 |
| WO | WO 00/72794 A1 | 12/2000 |
| WO | WO 00/73058 A1 | 12/2000 |
| WO | WO 01/10373 A1 | 2/2001 |

OTHER PUBLICATIONS

Federal Test Method Standard (FTMS) No. 191A, Method 5514, "Water Resistance of Cloth; Low Range, Hydrostatic Pressure Method," Jul. 20, 1978, 3 pages.

INDA Standard Test Method IST 70.4 (01), "Standard Test Method for Water Vapor Transmission Rates of 500 to 100,000 gm/m$^2$ Day Through Nonwoven Fabrics and Plastic Barriers," Copyright 2001, pp. 129–133.

* cited by examiner

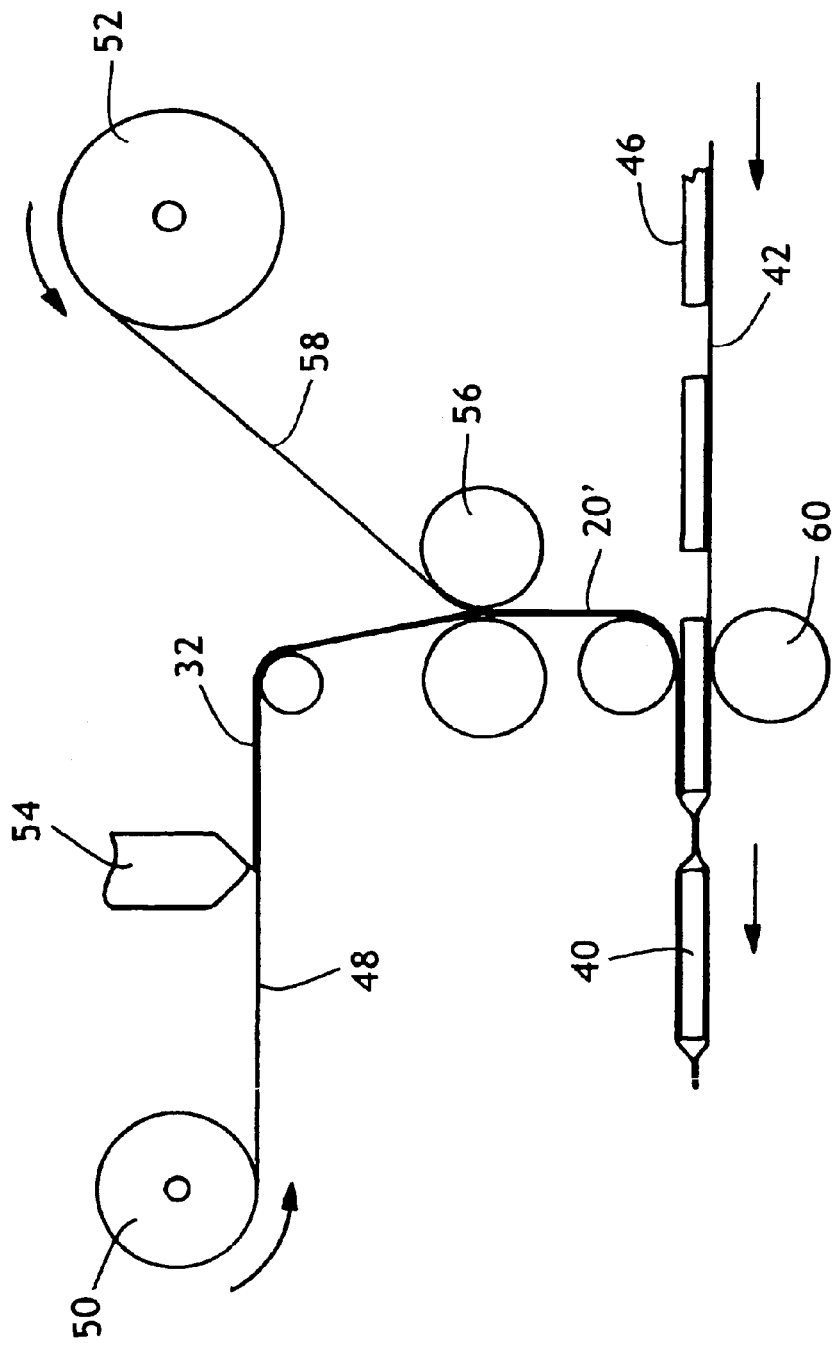

LAMINATE HAVING DIFFERENTIAL BOND STRENGTHS AND ABSORBENT ARTICLE MADE THEREFROM

BACKGROUND

Film/nonwoven laminates are used in a wide variety of applications, including outer covers for personal care absorbent articles, such as diapers, training pants, incontinence products, feminine hygiene products, sanitary napkins, wound dressings, bandages and the like. Film/nonwoven laminates also have been found useful in the health care area in such products as surgical drapes and gowns, clean room apparel, and sterilization wrappers, as well as in roll goods, such as tent material and covers for furniture, automobiles and other vehicles. Particularly in the field of personal care absorbent articles, an emphasis has been placed on development of low cost film/nonwoven laminates that form an effective barrier to passage of bodily exudates (liquids and other waste matter), while exhibiting good aesthetic and tactile properties, such as hand feel and drape. It is desirable for the film/nonwoven laminate to simulate woven cloth in tactile properties, while still providing a barrier to bodily exudates. For specific applications, it is also desirable for the laminate to permit the passage of water vapor or other gases (breathable) while retaining liquids.

One technique employed in attempting to achieve a satisfactory, low cost film/nonwoven laminate has been to use films of increasingly lesser gauge or thickness. Thinner films typically are lower in cost and due to the reduced gauge, often have increased softness and are quieter during use. Such lower gauge films also can be rendered breathable or microporous more easily. Such thin films can have an effective gauge or thickness of 0.6 mil or less and a basis weight of 25.0 grams per square meter (gsm) or less. Particularly, when such low gauge films are achieved by drawing or stretching, such as in the machine direction, the drawing or stretching orients the molecular structure of the polymer molecules within the film in the direction of stretching, thereby increasing the strength of the film in the machine direction. However, the same machine direction oriented film is weakened in the cross machine direction in terms of tensile strength and tear properties. In order to compensate for structural weaknesses in such unidirectionally stretched films, a support layer (or multiple support layers), such as a fibrous nonwoven web, have been laminated to the film layer to form a laminate having, among other properties, increased strength and durability.

Laminates of stretch-thinned films and nonwovens have been formed using thermal lamination techniques, in which heat and pressure, as with heated pattern rolls and ultrasonics, have been employed. Thermal lamination of films and nonwovens requires, however, that the polymeric materials used in forming the film and nonwoven be thermally compatible in order to effectively laminate the two materials. Thus, thermal lamination techniques can limit the freedom to select film and/or nonwoven polymers based upon cost, processability and/or performance criteria. In addition, even thermally compatible polymers may require a level of heat and pressure that result in the laminate being undesirably stiff and/or having poor tactile properties.

Such thermally laminated film/nonwoven laminates have in some instances, particularly when employed as an outer cover for personal care absorbent articles, exhibited insufficient strength and durability properties resulting in failures of the laminate during use of such absorbent articles. This type of failure is especially pronounced when the film/nonwoven laminate is used as an outer cover for an absorbent article where garment adhesive has been applied to the outer cover for securing the absorbent article to an undergarment while in use.

Because it is desirable for the laminate to be as flexible as possible, the lamination strength between the film and nonwoven layer is frequently minimized to improve tactile properties. It is also desirable to securely hold the absorbent article to undergarments while in use by using tacky pressure sensitive garment adhesives. This can result in the situation where the film/nonwoven lamination peel strength is less than the peel strength of the nonwoven layer with applied garment adhesive to the undergarment. Thus, when the absorbent article is removed from the wearer's undergarment, the nonwoven layer can remain attached to the undergarment while the rest of the absorbent article is removed as the film/nonwoven material delaminates. The foregoing then results in the undesirable task for the wearer to scrape, peel, or otherwise remove the remaining stuck portions of the absorbent article from their undergarment.

Therefore, there is a need for a film/nonwoven laminate, which exhibits improved tactile properties and improved removal properties when used as an outer cover for an absorbent article. There is also a need for a breathable film/nonwoven laminate with improved tactile properties and improved removal properties when used as an outer cover for an absorbent article.

SUMMARY OF THE INVENTION

An improved film/nonwoven laminate and resulting absorbent article has been invented that allows for minimum film/nonwoven lamination peel strength, thereby improving tactile properties while still removing cleanly from undergarments when used as an outer cover. It has been found that one such improved laminate and resulting absorbent article can be made by selecting an appropriate adhesive that laminates the film layer to the nonwoven layer, and simultaneously also adheres the absorbent article to undergarments while in use. The adhesive is applied to the exterior surface of the nonwoven portion of the film/nonwoven composite and through appropriate mechanisms is migrated to the interface between the film and nonwoven layer thereby laminating the two layers together. The adhesive can be used as the sole joining method for the film layer to the nonwoven layer or can assist other joining methods such as thermal bonding.

It has also been found that another improved laminate and resulting absorbent article can be made by manufacturing a laminate having at least two different bond strengths joining the laminate's plies together. For instance, low strength thermal bonds can be used to join a large portion of the two plies, while higher strength adhesive bonds can be used to join selected portions of the plies together. This allows for construction of a laminate having improved tactile properties and improved bond peel strength.

Thus, in one aspect the invention resides in a laminate including: a liquid-impermeable first layer having a first surface, a second layer having an interior surface adjacent the first surface and an exterior surface, at least a portion of the interior surface is joined to the first surface by an adhesive applied to the exterior surface, and the adhesive having a first bond peel strength of about 1 g/mm or greater.

In another aspect, the invention resides in a laminate including: a liquid-impermeable first layer having a first surface, a second layer having an interior surface adjacent the first surface and an exterior surface, at least a portion of the interior surface is joined to the first surface by first bonds having a first bond peel strength of about 1 g/mm or greater, and at least a portion of the interior surface is joined to the first surface by second bonds having a second bond peel strength of about 3 g/mm or less.

In another aspect, the invention resides in an absorbent article including: a topsheet, a bottomsheet, and an absorbent structure disposed between the topsheet and the bottomsheet. The bottomsheet is characterized by a liquid-impermeable first layer having a first surface, a second layer having an interior surface adjacent the first surface and an exterior surface, and at least a portion of the interior surface is joined to the first surface by an adhesive applied to the exterior surface having a first bond peel strength of about 1 g/mm or greater.

In yet another aspect, the invention resides in an absorbent article including: a topsheet, a bottomsheet, and an absorbent structure disposed between the topsheet and the bottomsheet. The bottomsheet is characterized by a liquid-impermeable first layer having a first surface, a second layer having an interior surface adjacent the first surface and an exterior surface, at least a portion of the interior surface is joined to the first surface by first bonds having a first bond peel strength of about 1 g/mm or greater, and at least a portion of the interior surface is joined to the first surface by second bonds having a second bond peel strength of about 3 g/mm or less.

BRIEF DESCRIPTION OF THE DRAWINGS

The above aspects, and other features, aspects, and advantages of the present invention will become better understood with regard to the following description, appended claims, and accompanying drawings where:

FIG. 6 illustrates a portion of a schematic process useful to make the absorbent article of FIG. 5.

DEFINITIONS

As used herein the term "nonwoven" means a web having a structure of individual fibers or threads which are interlaid, but not in an identifiable manner as in a knitted fabric. Nonwoven fabrics or webs have been formed from many processes such as for example, meltblowing processes, spunbonding processes, and bonded carded web processes. The basis weight of nonwoven fabrics is usually expressed in ounces of material per square yard (osy) or grams per square meter (gsm) and the fiber diameters useful are usually expressed in microns. (To convert from osy to gsm, multiply osy by 33.91).

As used herein "joined or joining" includes configurations where one element is directly or indirectly attached to another element by any means including, but not limited to, adhesives, thermal bonding, ultrasonic bonding, chemical bonding, mechanical bonding, pressure bonding, heat and pressure bonding, hydrogen bonding, fasteners, stitching, or other means known to those skilled in the art. Joined also includes elements that are indirectly joined together. By "indirectly joined" it is meant one element is attached to a second element by one or more intermediate members. For instance, the outer layers in an ordinary plywood laminate are indirectly joined to each other by the laminate's intermediate layers.

As used herein "liquid-impermeable" means a material, as tested by a hydro head, which is capable of supporting about 20 cm of water or greater without substantial leakage therethrough. The test method used for determining the resistance of a material to liquid penetration is Federal Test Methods Standard No. 191A Method 5514: "Water Resistance of Cloth; Low Range" dated Jul. 20, 1978.

As used herein "vapor permeable or breathable" means the material permits the transmission of water vapor and other gases. Vapor permeable or breathable materials will have a water vapor transmission rate (WVTR) of about 300 grams of $H_2O/m^2/24$ hours or greater. The test method for testing the WVTR of materials is INDA standard test IST 70.4(01) "Standard Test Method for Water Vapor Transmission Rates of 500 to 100,000 $gm/m^2/day$ through nonwoven fabrics and plastic barriers". The Association of the Nonwovens Fabric Industry, having an office in Cary, N.C., publishes the test method.

DETAILED DESCRIPTION

Figure 1:
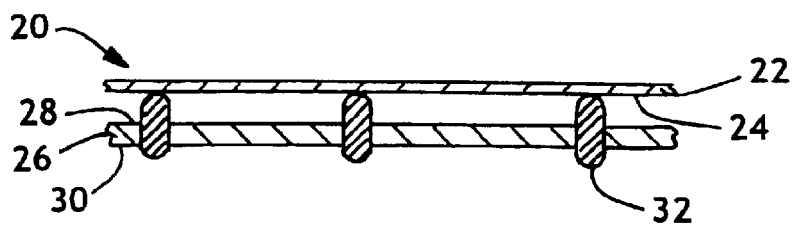
FIG. 1 illustrates a cross-section view of one embodiment for the laminate of the present invention.

Referring now to FIG. 1, a laminate 20 is shown which includes a first layer 22 having a first surface 24, and a second layer 26 having an interior surface 28 adjacent the first surface 24 and an exterior surface 30. An adhesive 32 is applied directly or indirectly to the exterior surface 30, and the adhesive 32 joins at least a portion of the interior surface 28 to the first surface 22 joining the layers of the laminate 20 together. It should be understood that FIG. 1 is for illustrative purposes only. The relative thickness of each layer can vary, the spacing of the adhesive can vary, and the first surface 24 and interior surface 28 will substantially contact each other as opposed to the exploded view illustrated.

The first layer 22 is liquid-impermeable and can be vapor permeable. The first layer 22 is desirably a film of an extrudable thermoplastic polymer, such as polyolefin or a blend of polyolefins. The first layer 22 can also include organic and inorganic fillers, and can be mechanically stretched producing apertures for vapor permeability as known to those of skill in the art. The first layer 22 can also be a laminate of one or more layers such as two film layers joined together. In one embodiment, the first layer was an apertured 18.6 gsm polyethylene based film. The first layer 22 can be relatively thin for improved tactical properties, and is desirably about 1 mil thick or less. More desirable, the first layer 22 is about 0.5 mils or less, and more desirable still the first layer 22 is about 0.3 mils or less.

The second layer 26 is joined to the first layer 22 by an adhesive 32 applied to the exterior surface 30 as previously mentioned. The second layer 26 can be a woven or nonwoven web such as a spunbond, meltblown, bonded carded, or tissue web. In addition, the second layer can include more than one nonwoven layer such as a spunbond/meltblown composite, a spunbond/meltblown/spunbond composite or other composite having two or more nonwoven layers. In one embodiment, the second layer was a 17.0 gsm spunbond polypropylene web.

Joining the layers of the laminate 20 together is the adhesive 32 applied to the exterior surface 30 of the second layer 26. The adhesive 32 is applied to the exterior surface 30 after the two layers are adjacent to each other instead of directly to the first surface 24 or the interior surface 28 prior to plying the laminate's two layers together. After application, the adhesive 32 is then migrated to the interface between the first layer 22 and the second layer 24, where it joins the layers together.

This method for applying the adhesive to join the two layers together is done for several reasons. First, the first layer 22 is often a film layer that is relatively thin, which is desirable to improve tactile properties and to reduce cost, but this can make the first layer more fragile. In addition, desirable adhesives to join the first and second layers, 22 and 26, together are generally solid at room temperatures and require heating prior to their application. When the hot adhesive 32 is applied directly to either the first surface 24 or the interior surface 28 during lamination, the first layer 22 can melt or rupture from the presence of the hot adhesive 32. When this occurs the laminate's ability to prevent liquid migration is compromised, and when used as an outer cover for an absorbent article leakage can occur at the rupture locations. By applying the adhesive 32 to the exterior surface 30, and ensuring migration of the adhesive 32 to the first layer 22, a higher melting point adhesive can be used without damaging the first layer 22.

Second, by applying the adhesive 32 to the exterior surface 30 the strength of the laminate 20 can be affected in localized zones where needed, when used as an outer cover for absorbent articles. This improves the laminate's delamination strength in the localized zones without unduly stiffening the entire laminate's structure. For instance, in a sanitary napkin the adhesive 32 can be applied in an area where garment adhesive is normally placed. The adhesive 32 can function as both the laminate's joining means and as the absorbent article's garment attachment means if desired. Alternatively, the adhesive 32 can be used in combination with an additional garment adhesive to locally strengthen the laminate's peel strength in an area where the garment adhesive is applied and the laminate is subjected to peel forces upon removal of the absorbent article. Similarly, the adhesive 32 can be used to strengthen selected areas of a diaper such as zones where the tape fasteners attach or in areas where the absorbent core is fastened to locally increase the delamination strength of the outer cover.

Finally, the adhesive 32 can be applied such that a portion of the adhesive remains on the exterior surface 30 after application. As mentioned, this feature can be used to secure an absorbent article during use. However, this feature has other applications where it is desirable to secure the laminate during use. For instance, this feature could be used to produce drop cloths for painters, tablecloths, or automobile covers. In each instance, the adhesive 32 can join the laminate's two layers together while a portion of the adhesive can remain on the exterior surface to secure article in use.

Figure 2:
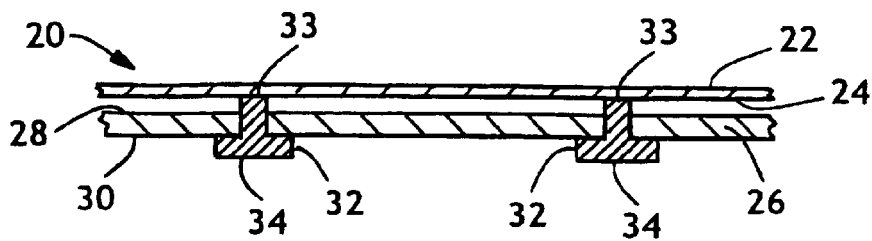
FIG. 2 illustrates a cross-section view of another embodiment for the laminate of the present invention.
Figure 3:
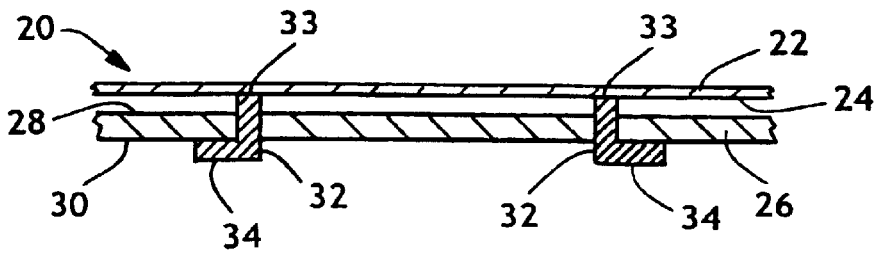
FIG. 3 illustrates a cross-section view of another embodiment for the laminate of the present invention.

Referring now to FIGS. 2 and 3, alternative embodiments for the laminate 20 are shown. In these embodiments, the adhesive 32 has been applied with a special applicator such that a portion of the adhesive 32 migrates into contact with the first layer 22 while another portion remains primarily on the exterior surface 30. This results in the adhesive 32 having a first surface area 33 and a second surface area 34. The first surface area 33 is in contact with the first surface 24 while the second surface area 34 remains primarily on the exterior surface 30. As used herein "first surface area" is area of the adhesive in contact with the first surface 24. As used herein "second surface area" is area of the adhesive present on the exterior surface 30.

Several advantages result when the adhesive 32 used to join the first and second layers, 22 and 26, is applied as shown in FIGS. 2 and 3. First, the overall amount of the adhesive 32 needed can be reduced as only a portion of the applied adhesive is migrated into contact with the first surface 24 to join the layers together. Second, the flexibility and drape of the laminate 20 is improved since a smaller area of the first layer 22 is joined to the second layer 26 by the adhesive 32. Finally, the second surface area 34 can be increased relative to the first surface area 33 to improve adhesion of the laminate 20 to other surfaces, such as undergarments, while reducing the overall amount of adhesive 32 required.

Desirably, the first surface area 33 is less than the second surface area 34. More desirable, the first surface area is between about 25 percent to about 75 percent of the second surface area 34. More desirable still, the first surface area is between about 50 percent to about 67 percent of the second surface area. As used herein "percent" means subtracting the first surface area 33 from the second surface area 34, then dividing that result by the second surface area 34, and then multiplying that result by 100.

The adhesive applicator used to make the laminate in FIG. 2 can have a "T" shaped orifice while the adhesive applicator used to make the laminate of FIG. 3 can have an "L" shaped orifice. In both instances, more adhesive is applied to the exterior surface 32 in one region relative to another region. When the adhesive 32 is migrated to the first layer 22, only the regions having additional adhesive contain a sufficient amount to ensure adhesive contact with the first surface 24, which then joins the laminate's two layers together. It is possible to use differently shaped applicators or alternative geometric shapes for the adhesive 32 having a first area 33 less than the second area 34.

The adhesive 32 can be migrated to the first layer 22 by selecting an appropriate viscosity adhesive that wicks through the second layer 26 by capillary action, using a more open structure nonwoven second layer 26 with sufficient void areas, or by using a nip to force the adhesive from the exterior surface 30 through the second layer 26 to the interior surface 28 of the first layer 22. The adhesive 32 can be applied by any suitable process such as slot coating, gravure coating, blade coating, or spraying.

The adhesive 32 can be any suitable hot melt, water, or solvent borne adhesive that will join the first layer 22 to the second layer 26. Suitable adhesives include conventional hot melt adhesives, pressure-sensitive adhesives, and reactive adhesives such as polyurethane. Block copolymer-type adhesives, ethylene vinyl acetate based adhesives, and amorphous alphaolefin copolymer and terpolymer based adhesives have been found to work well in joining the laminate's layers together. In one particular embodiment, the adhesive 32 was a hot melt pressure sensitive adhesive known as EASYMELT 34-5602 manufactured by National Starch and Chemical Company having an office in Bridgewater, N.J.

Figure 4:
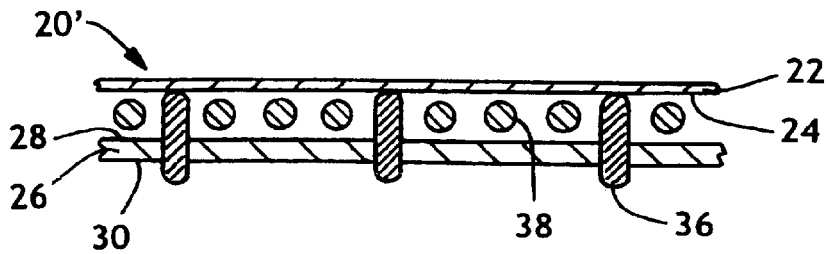
FIG. 4 illustrates a cross-section view of another embodiment for the laminate of the present invention.

Referring now to FIG. 4, an alternative embodiment for the laminate 20' is illustrated. The laminate 20' includes a first layer 22 having a first surface 24, and a second layer 26 having an interior surface 28 adjacent the first surface and an exterior surface 30. The first layer 22 is liquid-impermeable and can be vapor permeable. The second layer 26 can be a woven or nonwoven web. A portion of the laminate 20' is joined together by first bonds 36, and another portion of the laminate is joined together by second bonds 38. As used herein "first or second bonds" include any method of joining as defined in the Definitions section. It is understood that FIG. 4 is for illustrative purposes only. The relative thickness of each layer can vary, the spacing of the first and second bonds, 36 and 38, can vary and the first surface 24 and the interior surface 28 will substantially contact each other as opposed to the exploded view illustrated.

To improve the tactile and the delamination properties of the laminate, it is desirable to join the first and second layers, 22 and 26, together with the first bonds 36 and the second bonds 38. The first bonds 36 can secure a smaller area of the layers together, and can have greater bonding strength than the second bonds 38. This provides the necessary strength to prevent delamination, but does not unduly stiffen the laminate. More desirable first bonds 36 are adhesives applied to the exterior surface 30 that join a portion of the first layer 22 to the second layer 26; although other joining methods can be used such as thermal bonds. The adhesive first bonds 36 can be applied to the exterior surface 30 such that a portion of the adhesive is migrated into contact with the first layer 22 while another portion remains primarily on the exterior surface 30 as illustrated in FIGS. 2 and 3 and previously discussed.

The first bonds 36 have a first bond peel strength as tested in the Test Methods section. The bond peel strength is a measure of the delamination resistance provided by the bond. Desirably, the first bond peel strength is about 1 g/mm or greater. More desirable, the first bond peel strength is about 2 g/mm or greater, more desirable still, the first bond peel strength is about 3 g/mm or greater, and most desirable, the first bond peel strength is about 4 g/mm or greater.

The second bonds 38 can secure a larger area of the layers together, and can have lower bonding strength than the first bonds 36. Desirable second bonds 38 are thermal bonds or adhesives having low tack and high flexibility, although other joining methods can be used. The second bonds 38 have a second bond peel strength as tested in the Test Methods section. The bond peel strength is a measure of the delamination resistance provided by the bond. Desirably, the second bond peel strength is about 3 g/mm or less. More desirable, the second bond peel strength is about 2 g/mm or less, more desirable still, the second bond peel strength is about 1 g/mm or less, and most desirable, the second bond peel strength is about 0.5 g/mm or less.

Figure 5:
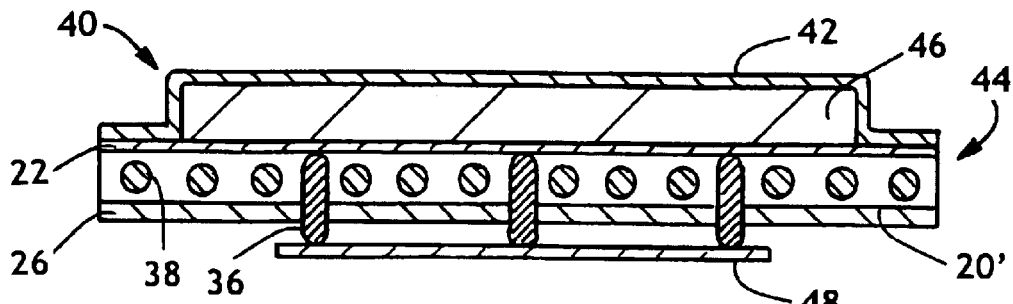
FIG. 5 illustrates a cross-section view of one embodiment for an absorbent article of the present invention.

Referring now to FIG. 5, an absorbent article 40 is illustrated in cross-section. The absorbent article includes a topsheet 42, a bottomsheet 44, and an absorbent structure 46 disposed between the topsheet and the bottomsheet. The bottomsheet 44 of the absorbent article is the laminate 20' from FIG. 4, however; the laminate 20 from FIG. 1, 2, or 3 would also be suitable. Suitable materials for the topsheet and the absorbent structure are known to those of skill in the art. Desirably, the bottomsheet 44 is vapor permeable. More desirable, the bottomsheet 44 has a WVTR of about 1,000 grams of $H_2O/m^2/24$ hours or greater. More desirable still, the bottomsheet 44 has a WVTR of about 5,000 grams of $H_2O/m^2/24$ hours or greater.

The absorbent article 40 can include a peel strip 48 to cover the exposed portion of the adhesive 32 used for the first bonds 36, which can also secure the absorbent article in place. Alternatively, the absorbent article 40 can be manufactured and folded by methods known to those of skill in the art such that a peel strip is not required. The absorbent article 40 can include additional components known to those of skill in the art such as transfer layers, distribution layers, multiple absorbent layers, stiffeners. wings, side flaps, elastics, and the like.

The topsheet 42 is fluid permeable, compliant, soft feeling, and non-irritating to the wear's skin. A suitable topsheet can be manufactured from a wide range of materials such as woven or nonwoven materials; polymeric materials such as apertured formed thermoplastic films, apertured plastic films, and hydroformed thermoplastic films; and thermoplastic scrims. Suitable woven and nonwoven materials can be comprised of natural fibers such as wood or cotton; synthetic fibers such as polyester, polypropylene, or polyethylene; or from a combination of natural and synthetic fibers, or bi/multi-component fibers.

The absorbent structure 46 is a fluid storage and distribution medium that can include multiple layers. The absorbent structure 46 can comprise any absorbent material such as wood fibers, cotton fibers, foams, synthetic fibers, or superabsorbents. Desirably, the absorbent structure 46 is a mixture of cellulose fluff and superabsorbent particles.

In one embodiment, the bottomsheet 44 was adhesively reinforced Corinth C-Star material specification no. 2516, which is a highly breathable stretched thermal laminate (HBSTL) that is available from Kimberly-Clark Corporation having offices in Neenah, Wis. HBSTL is disclosed in U.S. Pat. No. 6,075,179 entitled: "Low Gauge Films And Film/Nonwoven Laminates" issued Jun. 13, 2000, and in U.S. Pat. No. 6,309,736 entitled: "Low Gauge Films And Film/Nonwoven Laminates" issued Oct. 30, 2001 both of which are herein incorporated by reference. HBSTL has a minimum WVTR of at least 6,400 grams of $H_2O/m^2/24$ hours. HBSTL is manufactured with thermal second bonds 38. The first bonds 36 were an adhesive 32 applied to the exterior surface 30 during manufacture of the absorbent article 40. The bottomsheet 44 (the laminate 20') was tested according to the Bond Peel Strength test method. After testing, the first bond peel strength was determined to be 3.2 g/mm, and the second bond peel strength was determined to be 0.9 g/mm.

Referring now to FIG. 6, a simplified schematic of one portion of an absorbent article manufacturing process is shown. The process of making the laminate of FIG. 4 starts with a peel strip unwind 50 that directs the peel strip 48 under a slot coater 54, which applies the adhesive 32 to the peel strip 48. A bottomsheet unwind 52 directs a web of HBSTL 58 towards a first nip 56 where the peel strip 48 with the adhesive is joined to the web of HBSTL 58 forming the laminate 20'.

It is desirable that the adhesive 32 be applied such that the viscosity of the adhesive is in a range that will allow it to penetrate through the second layer 26 of the HBSTL web 58 to the first layer 22 without burning or melting the first layer. The viscosity of the adhesive 32 at the point of contact with the HBSTL web 58 is affected by the particular adhesive composition used and the adhesive's temperature at the first nip 56. Generally, an increase in the adhesive's temperature improves adhesive penetration. Other factors affecting the degree of penetration are the first nip's loading, and the porosity of the second layer 26. In general, increasing the nip pressure or reducing the basis weight of the second layer 26 improves adhesive penetration.

The laminate 20' functions as the bottomsheet 44 for the absorbent article 40 and is combined with a topsheet 42 and an absorbent structure 46 by a second nip 60 forming the absorbent article 40. Additional adhesives and applicators (not shown) are used to join the various portions of the topsheet 42, absorbent structure 46, and bottomsheet 44 to one another to hold the absorbent article 40 together as are known to those of skill in the art.

Alternatively (not shown), the HBSTL web 58 or bottomsheet 44 could already be positioned on top of the absorbent structure 46 prior to the second nip 60. The first nip 56 could then be eliminated and the second nip 60 used to apply the slot coated peel strip 48 with adhesive 32. Such a manufacturing sequence may be preferred when the absorbent structure 46 is relatively thin. Alternatively (not shown), the adhesive 32 could be directly applied to the second layer 26 using a slot coater instead of the indirect application technique of applying the adhesive 32 to the peel strip 48 first. Such a manufacturing sequence can be used when the absorbent article 40 is manufactured without a peel strip 48.

TEST METHODS

Bond Peel Strength

The bond peel strength or delamination force measures the amount of tensile force per unit width of sample required to pull the layers of the laminate apart during a 180° peel test. The testing is conducted on samples of the laminate For this test, two sample sets are prepared. Five samples measuring 19 mm wide by 203 mm long are cut from an area of the laminate where only the first bonds 36 are present. Another five samples measuring 19 mm wide by 203 mm long are cut from an area of the laminate where only the second bonds 38 are present. The width and length of the samples can be adjusted to suit the specific spacing and size of the first and second bonds in order to eliminate samples having both first and second bonds present. When the sample size is varied, the force per unit width and average peel strength calculations are adjusted accordingly.

Calibrate the tensile tester according to the manufacturer's directions. After the samples are cut, one end of each sample is delaminated by hand such that sufficient material is present to clamp and hold the sample. For each sample, the first layer 22 is inserted and clamped into the upper jaw of the tensile tester. The second layer is inserted and clamped into the lower jaw of the tensile tester. Each jaw should have a suitable facing in contact with the sample to securely hold the first or second layer without slipping or breaking as the laminate is pulled apart. The jaws of the tensile tester are initially separated by 50.8 mm at the start of the test.

Set the tensile tester to move the jaws apart at a speed of 508 mm/min. Start the test and record the load cell output for 500 data points starting when the crosshead has moved a distance of 25.4 mm and continuing until the crosshead has moved a distance of 152.4 mm as the sample is pulled apart. Ensure that the sample is sufficiently long such that it is not completely pulled apart before the crosshead has traveled 152.4 mm. The 500 data points are then averaged to determine the average peel force for each sample. Other sampling rates, sampling periods, and crosshead movement durations can be used to obtain a statically valid average peel force for samples requiring a different sample size.

After delaminating the sample, calculate the average peel force per unit width for each sample by dividing the average peel force in grams by the sample width in millimeters. Next, calculate a grand average for each sample set by averaging the five results obtained for each individual sample. The grand average for each sample set is reported as the first or second bond peel strength in g/mm.

Suitable tensile testers for use with this test, among others, include the Sintech 2 tester, available from the Sintech Corporation, 1001 Sheldon Dr., Cary, N.C. 27513, the Instron Model TM, available from the Instron Corporation, 2500 Washington St., Canton, Mass. 02021, or the Thwing-Albert Model INTELLECT II available from the Thwing-Albert Instrument Co., 10960 Dutton Rd., Philadelphia, Pa. 19154.

It will be appreciated that the foregoing description, given for purposes of illustration, is not to be construed as limiting the scope of this invention, which is defined by the following claims and all equivalents thereto.

We claim:

1. A laminate comprising:
   a) a liquid-impermeable film layer having a first surface;
   b) a nonwoven layer having an interior surface positioned adjacent to said first surface of said film layer and an exterior surface;
   c) at least a portion of said interior surface joined to said first surface of said film layer by first bonds having a first bond peel strength of about 1 g/mm or greater; and
   d) at least a portion of said interior surface joined to said first surface of said film layer by second bonds having a second bond peel strength of about 3 g/mm or less.

2. The laminate of claim 1 wherein said first bonds include an adhesive applied to said exterior surface of said nonwoven layer and said adhesive is capable of migrating to said interior surface.

3. The laminate of claim 2 wherein said adhesive has a first area in contact with said first surface of said film layer and a second area on said exterior surface, and said first area is less than said second area.

4. The laminate of claim 1 wherein said second bonds are thermal bonds.

5. The laminate of claim 1 wherein said first bond peel strength is greater than said second bond peel strength.

6. The laminate of claim 5 wherein said first bond peel strength is about 2 g/mm or greater.

7. The laminate of claim 5 wherein said first bond peel strength is about 3 g/mm or greater.

8. The laminate of claim 5 wherein said second bond peel strength is about 2 g/mm or less.

9. The laminate of claim 5 wherein said second bond peel strength is about 1 g/mm or less.

10. The laminate of claim 1 wherein said laminate is vapor permeable and has a water vapor transmission rate of about 1000 grams of $H_2O/m^2/24$ hours or greater.

11. An absorbent article comprising:
    a) a topsheet;
    b) a bottomsheet including a liquid-impermeable film layer having a first surface, a nonwoven layer having an interior surface positioned adjacent to said first surface of said film layer and an exterior surface, at least a portion of said interior surface joined to said first surface of said film layer by first bonds having a first bond strength of about 1 g/mm or greater, and at least a portion of said interior surface joined to said first surface of said film layer by second bonds having a second bond strength of about 3 g/mm or less; and
    c) an absorbent structure disposed between said topsheet and said bottomsheet.

12. The absorbent article of claim 11 wherein said first bonds include an adhesive applied to said exterior surface of said nonwoven layer and said adhesive is capable of migrating to said interior surface.

13. The absorbent article of claim 12 wherein said adhesive joins said first layer of said film layer to said second layer and secures placement of said absorbent article in use.

14. The absorbent article of claim 12 wherein said adhesive has a first area in contact with said first surface of said film layer and a second area in contact with said exterior surface, and said first area is less than said second area.

15. The absorbent article of claim 14 wherein said first area is from between about 25 percent to about 75 percent of said second area.

16. The absorbent article of claim 12 wherein said second bonds are thermal bonds.

17. The absorbent article of claim 12 wherein said first bond strength is greater than said second bond strength.

18. The absorbent article of claim 17 wherein said first bond strength is about 2 g/mm or greater.

19. The absorbent article of claim 17 wherein said second bond strength is about 2 g/mm or less.

20. The absorbent article of claim 14 wherein said bottomsheet is vapor permeable and has a water vapor transmission rate of about 1000 grams of $H_2O/m^2/24$ hours or greater.

* * * * *